United States Patent
Lelescu et al.

(10) Patent No.: US 9,445,003 B1
(45) Date of Patent: Sep. 13, 2016

(54) SYSTEMS AND METHODS FOR SYNTHESIZING HIGH RESOLUTION IMAGES USING IMAGE DECONVOLUTION BASED ON MOTION AND DEPTH INFORMATION

(71) Applicant: Pelican Imaging Corporation, Mountain View, CA (US)

(72) Inventors: Dan Lelescu, Morgan Hill, CA (US); Thang Duong, Mountain View, CA (US)

(73) Assignee: Pelican Imaging Corporation, Santa Clara, CA (US)

( * ) Notice: Subject to any disclaimer, the term of this patent is extended or adjusted under 35 U.S.C. 154(b) by 0 days.

(21) Appl. No.: 14/200,629

(22) Filed: Mar. 7, 2014

Related U.S. Application Data

(60) Provisional application No. 61/788,078, filed on Mar. 15, 2013.

(51) Int. Cl.
| | |
|---|---|
| *H04N 5/232* | (2006.01) |
| *H04N 5/225* | (2006.01) |
| *H04N 5/222* | (2006.01) |
| *H04N 5/355* | (2011.01) |
| *G06T 5/00* | (2006.01) |

(52) U.S. Cl.
CPC ........... *H04N 5/23232* (2013.01); *G06T 5/003* (2013.01); *H04N 5/2258* (2013.01); *H04N 5/23264* (2013.01); *H04N 5/35545* (2013.01); *H04N 5/2226* (2013.01); *H04N 5/23251* (2013.01)

(58) Field of Classification Search
None
See application file for complete search history.

(56) References Cited

U.S. PATENT DOCUMENTS

| | | |
|---|---|---|
| 4,124,798 A | 11/1978 | Thompson |
| 4,198,646 A | 4/1980 | Alexander et al. |
| 4,323,925 A | 4/1982 | Abell et al. |

(Continued)

FOREIGN PATENT DOCUMENTS

| | | |
|---|---|---|
| EP | 840502 A2 | 5/1998 |
| EP | 2336816 A2 | 6/2011 |

(Continued)

OTHER PUBLICATIONS

International Search Report and Written Opinion for International Application No. PCT/US13/46002, Search Completed Nov. 13, 2013, Mailed Nov. 29, 2013, 7 pgs.

(Continued)

*Primary Examiner* — Albert Cutler
(74) *Attorney, Agent, or Firm* — KPPB LLP

(57) ABSTRACT

Systems and methods for synthesizing high resolution images using image deconvolution and depth information in accordance embodiments of the invention are disclosed. In one embodiment, an array camera includes a processor and a memory, wherein an image deconvolution application configures the processor to obtain light field image data, determine motion data based on metadata contained in the light field image data, generate a depth-dependent point spread function based on the synthesized high resolution image, the depth map, and the motion data, measure the quality of the synthesized high resolution image based on the generated depth-dependent point spread function, and when the measured quality of the synthesized high resolution image is within a quality threshold, incorporate the synthesized high resolution image into the light field image data.

2 Claims, 7 Drawing Sheets

(56) References Cited

U.S. PATENT DOCUMENTS

| | | |
|---|---|---|
| 4,460,449 A | 7/1984 | Montalbano |
| 5,005,083 A | 4/1991 | Grage |
| 5,808,350 A | 9/1998 | Jack et al. |
| 5,832,312 A | 11/1998 | Rieger et al. |
| 5,880,691 A | 3/1999 | Fossum et al. |
| 5,933,190 A | 8/1999 | Dierickx et al. |
| 5,973,844 A | 10/1999 | Burger |
| 6,002,743 A | 12/1999 | Telymonde |
| 6,034,690 A | 3/2000 | Gallery et al. |
| 6,069,365 A | 5/2000 | Chow et al. |
| 6,124,974 A | 9/2000 | Burger |
| 6,137,535 A | 10/2000 | Meyers |
| 6,141,048 A | 10/2000 | Meyers |
| 6,358,862 B1 | 3/2002 | Ireland et al. |
| 6,603,513 B1 | 8/2003 | Berezin |
| 6,611,289 B1 | 8/2003 | Yu |
| 6,635,941 B2 | 10/2003 | Suda |
| 6,671,399 B1 | 12/2003 | Berestov |
| 6,765,617 B1 | 7/2004 | Tangen et al. |
| 6,771,833 B1 | 8/2004 | Edgar |
| 6,774,941 B1 | 8/2004 | Boisvert et al. |
| 6,879,735 B1 | 4/2005 | Portniaguine et al. |
| 6,903,770 B1 | 6/2005 | Kobayashi et al. |
| 6,909,121 B2 | 6/2005 | Nishikawa |
| 6,958,862 B1 | 10/2005 | Joseph et al. |
| 7,085,409 B2 | 8/2006 | Sawhney et al. |
| 7,199,348 B2 | 4/2007 | Olsen et al. |
| 7,262,799 B2 | 8/2007 | Suda |
| 7,292,735 B2 | 11/2007 | Blake et al. |
| 7,295,697 B1 | 11/2007 | Satoh |
| 7,391,572 B2 | 6/2008 | Jacobowitz et al. |
| 7,606,484 B1 | 10/2009 | Richards et al. |
| 7,633,511 B2 | 12/2009 | Shum et al. |
| 7,657,090 B2 | 2/2010 | Omatsu et al. |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,297 B2 * | 1/2012 | Crisan et al. ............ 348/231.2 |
| 8,106,949 B2 | 1/2012 | Tan et al. |
| 8,126,279 B2 | 2/2012 | Marcellin et al. |
| 8,131,097 B2 | 3/2012 | Lelescu et al. |
| 8,169,486 B2 * | 5/2012 | Corcoran et al. ........ 348/208.13 |
| 8,180,145 B2 | 5/2012 | Wu et al. |
| 8,189,089 B1 | 5/2012 | Georgiev |
| 8,213,711 B2 | 7/2012 | Tam |
| 8,231,814 B2 | 7/2012 | Duparre |
| 8,305,456 B1 | 11/2012 | McMahon |
| 8,360,574 B2 | 1/2013 | Ishak et al. |
| 8,406,562 B2 | 3/2013 | Bassi et al. |
| 8,514,491 B2 | 8/2013 | Duparre |
| 8,542,933 B2 | 9/2013 | Venkataraman et al. |
| 8,648,918 B2 * | 2/2014 | Kauker et al. ............ 348/208.6 |
| 9,019,426 B2 * | 4/2015 | Han et al. .................... 348/369 |
| 2001/0005225 A1 | 6/2001 | Clark et al. |
| 2002/0012056 A1 | 1/2002 | Trevino |
| 2002/0027608 A1 | 3/2002 | Johnson |
| 2002/0063807 A1 | 5/2002 | Margulis |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0113867 A1 | 8/2002 | Takigawa et al. |
| 2002/0113888 A1 | 8/2002 | Sonoda et al. |
| 2002/0163054 A1 | 11/2002 | Suda |
| 2002/0167537 A1 | 11/2002 | Trajkovic |
| 2002/0177054 A1 | 11/2002 | Saitoh et al. |
| 2003/0124763 A1 | 7/2003 | Fan et al. |
| 2003/0179418 A1 | 9/2003 | Wengender et al. |
| 2003/0211405 A1 | 11/2003 | Venkataraman |
| 2004/0008271 A1 | 1/2004 | Hagimori et al. |
| 2004/0012689 A1 | 1/2004 | Tinnerino |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0100570 A1 | 5/2004 | Shizukuishi |
| 2004/0114807 A1 | 6/2004 | Lelescu et al. |
| 2004/0165090 A1 | 8/2004 | Ning |
| 2004/0170340 A1 | 9/2004 | Tipping et al. |
| 2004/0174439 A1 | 9/2004 | Upton |
| 2004/0207836 A1 | 10/2004 | Chhibber et al. |
| 2004/0213449 A1 | 10/2004 | Safaee-Rad et al. |
| 2004/0234873 A1 | 11/2004 | Venkataraman |
| 2004/0251509 A1 | 12/2004 | Choi |
| 2005/0006477 A1 | 1/2005 | Patel |
| 2005/0012035 A1 | 1/2005 | Miller |
| 2005/0036778 A1 | 2/2005 | DeMonte |
| 2005/0048690 A1 | 3/2005 | Yamamoto |
| 2005/0068436 A1 | 3/2005 | Fraenkel et al. |
| 2005/0132098 A1 | 6/2005 | Sonoda et al. |
| 2005/0134712 A1 | 6/2005 | Gruhlke et al. |
| 2005/0151759 A1 | 7/2005 | Gonzalez-Banos et al. |
| 2005/0205785 A1 | 9/2005 | Hornback et al. |
| 2005/0219363 A1 | 10/2005 | Kohler |
| 2005/0225654 A1 | 10/2005 | Feldman et al. |
| 2005/0286612 A1 | 12/2005 | Takanashi |
| 2006/0002635 A1 | 1/2006 | Nestares et al. |
| 2006/0023197 A1 | 2/2006 | Joel |
| 2006/0023314 A1 | 2/2006 | Boettiger et al. |
| 2006/0038891 A1 | 2/2006 | Okutomi et al. |
| 2006/0054782 A1 | 3/2006 | Olsen et al. |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0210186 A1 | 9/2006 | Berkner |
| 2006/0243889 A1 | 11/2006 | Farnworth et al. |
| 2006/0251410 A1 | 11/2006 | Trutna |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0024614 A1 | 2/2007 | Tam |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0160310 A1 | 7/2007 | Tanida et al. |
| 2007/0171290 A1 | 7/2007 | Kroger |
| 2007/0211164 A1 | 9/2007 | Olsen et al. |
| 2007/0216765 A1 | 9/2007 | Wong et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0268374 A1 | 11/2007 | Robinson |
| 2007/0296835 A1 | 12/2007 | Olsen et al. |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0118241 A1 | 5/2008 | Tekolste et al. |
| 2008/0131019 A1 | 6/2008 | Ng |
| 2008/0151097 A1 | 6/2008 | Chen et al. |
| 2008/0152296 A1 | 6/2008 | Oh et al. |
| 2008/0218610 A1 | 9/2008 | Chapman et al. |
| 2008/0219654 A1 | 9/2008 | Border et al. |
| 2008/0247638 A1 | 10/2008 | Tanida et al. |
| 2008/0247653 A1 | 10/2008 | Moussavi et al. |

(56) References Cited

U.S. PATENT DOCUMENTS

| | | |
|---|---|---|
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0102956 A1 | 4/2009 | Georgiev |
| 2009/0109306 A1 | 4/2009 | Shan et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0225203 A1 | 9/2009 | Tanida et al. |
| 2009/0268192 A1 | 10/2009 | Koenck et al. |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0086227 A1 | 4/2010 | Sun et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0118127 A1 | 5/2010 | Nam et al. |
| 2010/0142839 A1 | 6/2010 | Lakus-Becker |
| 2010/0157073 A1 | 6/2010 | Kondo et al. |
| 2010/0177411 A1 | 7/2010 | Hegde et al. |
| 2010/0195716 A1 | 8/2010 | Klein Gunnewiek et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0265385 A1 | 10/2010 | Knight et al. |
| 2010/0281070 A1 | 11/2010 | Chan et al. |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0069189 A1 | 3/2011 | Venkataraman et al. |
| 2011/0080487 A1 | 4/2011 | Venkataraman et al. |
| 2011/0122308 A1 | 5/2011 | Duparre |
| 2011/0153248 A1 | 6/2011 | Gu et al. |
| 2011/0211824 A1 | 9/2011 | Georgiev et al. |
| 2011/0221658 A1 | 9/2011 | Haddick et al. |
| 2011/0241234 A1 | 10/2011 | Duparre |
| 2011/0279721 A1 | 11/2011 | McMahon |
| 2011/0285866 A1 | 11/2011 | Bhrugumalla et al. |
| 2011/0310980 A1 | 12/2011 | Mathew |
| 2012/0012748 A1 | 1/2012 | Pain et al. |
| 2012/0026342 A1 | 2/2012 | Yu et al. |
| 2012/0069235 A1 | 3/2012 | Imai |
| 2012/0113413 A1 | 5/2012 | Miahczylowicz-Wolski et al. |
| 2012/0147205 A1 | 6/2012 | Lelescu et al. |
| 2012/0198677 A1 | 8/2012 | Duparre |
| 2012/0249550 A1 | 10/2012 | Akeley et al. |
| 2012/0249836 A1* | 10/2012 | Ali et al. ............. 348/239 |
| 2012/0287291 A1 | 11/2012 | Mcmahon |
| 2012/0314033 A1 | 12/2012 | Lee et al. |
| 2013/0003184 A1 | 1/2013 | Duparre |
| 2013/0010073 A1 | 1/2013 | Do |
| 2013/0016885 A1* | 1/2013 | Tsujimoto ............. 382/128 |
| 2013/0050504 A1 | 2/2013 | Safaee-Rad et al. |
| 2013/0070060 A1 | 3/2013 | Chatterjee |
| 2013/0077880 A1 | 3/2013 | Venkataraman et al. |
| 2013/0077882 A1 | 3/2013 | Venkataraman et al. |
| 2013/0088489 A1* | 4/2013 | Schmeitz et al. ............. 345/419 |
| 2013/0088637 A1 | 4/2013 | Duparre |
| 2013/0128087 A1* | 5/2013 | Georgiev et al. ............. 348/307 |
| 2013/0147979 A1 | 6/2013 | McMahon et al. |
| 2013/0215108 A1 | 8/2013 | McMahon et al. |
| 2013/0265459 A1 | 10/2013 | Duparre et al. |
| 2014/0132810 A1 | 5/2014 | McMahon |
| 2014/0313315 A1* | 10/2014 | Shoham et al. ............. 348/80 |

FOREIGN PATENT DOCUMENTS

| | | |
|---|---|---|
| JP | 2006033493 A | 2/2006 |
| JP | 2007520107 A | 7/2007 |
| JP | 2011109484 A | 6/2011 |
| WO | 2007083579 A1 | 7/2007 |
| WO | 2011063347 A2 | 5/2011 |
| WO | 2011116203 A1 | 9/2011 |
| WO | 2011/063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012082904 A1 | 6/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014032020 A3 | 5/2014 |

OTHER PUBLICATIONS

International Search Report and Written Opinion for International Application No. PCT/US13/48772, Search Completed Oct. 21, 2013, Mailed Nov. 8, 2013, 6 pgs.
International Search Report and Written Opinion for International Application No. PCT/US13/56065, Search Completed Nov. 25, 2013, Mailed Nov. 26, 2013, 8 pgs.
International Search Report and Written Opinion for International Application No. PCT/US13/59991, Search Completed Feb. 6, 2014, Mailed Feb. 26, 2014, 8 pgs.
International Search Report and Written Opinion for International Application No. PCT/US2013/024987, Search Completed Mar. 27, 2013, Mailed Apr. 15, 2013, 14 pgs.
International Search Report and Written Opinion for International Application No. PCT/US2013/056502, Search Completed Feb. 18, 2014, Mailed Mar. 19, 2014, 7 pgs.
International Search Report and Written Opinion for International Application No. PCT/US2013/069932, Search Completed Mar. 14, 2014, Mailed Apr. 14, 2014, 12 pgs.
Search Report and Written Opinion for International Application PCT/US11/36349, mailed Aug. 22, 2011, 12 pgs.
International Search Report and Written Opinion for International Application No. PCT/US2011/64921, Report Completed Feb. 25, 2011, mailed Mar. 6, 2012, 17 pgs.
International Search Report and Written Opinion for International Application No. PCT/US2013/027146, completed Apr. 2, 2013, 12 pgs.
International Search Report and Written Opinion for International Application PCT/US2009/044687, completed Jan. 5, 2010, 13 pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US12/37670, Mailed Jul. 18, 2012, Search Completed Jul. 5, 2012, 9 pgs.

(56) References Cited

OTHER PUBLICATIONS

International Search Report and Written Opinion for International Application PCT/US2012/58093, completed Nov. 15, 2012, 12 pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "Light Field Superresolution", Retrieved from http://home.eps.hw.ac.uk/~sz73/ICCP09/LightFieldSuperresolution.pdf, 9 pgs. 9.
Kutulakos et al., "Occluding Contour Detection Using Affine Invariants and Purposive Viewpoint Control", Proc., CVPR 94, 8 pgs.
Lensvector, , "How LensVector Autofocus Works", http://www.lensvector.com/overview.html, 2010.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Muehlebach, "Camera Auto Exposure Control for VSLAM Applications", Studies on Mechatronics.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html, Nov. 2, 2012.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer 77, Sep. 9, 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Vuong et al., "A New Auto Exposure and Auto White-Balance Algorithm to Detect High Dynamic Range Conditions Using CMOS Technology".
Wang, "Calculation of Image Position, Size and Orientation Using First Order Properties", 10 pgs.
Wetzstein et al., , "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)".
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002) pp. 1-10.
Yang et al., "Superresolution Using Preconditioned Conjugate Gradient Method", Source and date unknown, 8 pgs.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.

(56) References Cited

OTHER PUBLICATIONS

Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.

Borman, "Topics in Multiframe Superresolution Restoration", Thesis of Sean Borman, Apr. 2004, 282 pgs.

Borman et al, "Image Sequence Processing", Source unknown, Oct. 14, 2002, 81 pgs.

Borman et al., "Block-Matching Sub-Pixel Motion Estimation from Noisy, Under-Sampled Frames—An Empirical Performance Evaluation", Proc SPIE, Dec. 1998, 3653, 10 pgs.

Borman et al., "Image Resampling and Constraint Formulation for Multi-Frame Super-Resolution Restoration", Proc. SPIE, Jun. 2003, 5016, 12 pgs.

Borman et al., "Linear models for multi-frame super-resolution restoration under non-affine registration and spatially varying PSF", Proc. SPIE, May 2004, vol. 5299, 12 pgs.

Borman et al., "Nonlinear Prediction Methods for Estimation of Clique Weighting Parameters in NonGaussian Image Models", Proc. SPIE, 1998. 3459, 9 pgs.

Borman et al., "Simultaneous Multi-Frame MAP Super-Resolution Video Enhancement Using Spatio-Temporal Priors", Image Processing, 1999, ICIP 99 Proceedings, vol. 3, pp. 469-473.

Borman et al., "Super-Resolution from Image Sequences—A Review", Circuits & Systems, 1998, pp. 374-378.

Bose et al., "Superresolution and Noise Filtering Using Moving Least Squares", IEEE Transactions on Image Processing, date unknown, 21 pgs.

Boye et al., "Comparison of Subpixel Image Registration Algorithms", Proc. of SPIE-IS&T Electronic Imaging, vol. 7246, pp. 72460X-1-72460X-9.

Bruckner et al., "Artificial compound eye applying hyperacuity", Optics Express, Dec. 11, 2006, vol. 14, No. 25, pp. 12076-12084.

Bruckner et al., "Driving microoptical imaging systems towards miniature camera applications", Proc. SPIE, Micro-Optics, 2010, 11 pgs.

Bruckner et al., "Thin wafer-level camera lenses inspired by insect compound eyes", Optics Express, Nov. 22, 2010, vol. 18, No. 24, pp. 24379-24394.

Capel, "Image Mosaicing and Super-resolution", [online], Retrieved on Nov. 10, 2012. Retrieved from the Internet at URL:<http://citeseerx.ist.psu.edu/viewdoc/download?doi=10.1.1.226.2643&rep=rep1&type=pdf>, Title pg., abstract, table of contents, pp. 1-263 (269 total pages).

Chan et al., "Extending the Depth of Field in a Compound-Eye Imaging System with Super-Resolution Reconstruction", Proceedings—International Conference on Pattern Recognition, 2006, vol. 3, pp. 623-626.

Chan et al., "Investigation of Computational Compound-Eye Imaging System with Super-Resolution Reconstruction", IEEE, ISASSP 2006, pp. 1177-1180.

Chan et al., "Super-resolution reconstruction in a computational compound-eye imaging system", Multidim. Syst. Sign Process, 2007, vol. 18, pp. 83-101.

Drouin et al., "Fast Multiple-Baseline Stereo with Occlusion", Proceedings of the Fifth International Conference on 3-D Digital Imaging and Modeling, 2005, 8 pgs.

Drouin et al., "Geo-Consistency for Wide Multi-Camera Stereo", Proceedings of the 2005 IEEE Computer Society Conference on Computer Vision and Pattern Recognition, 2005, 8 pgs.

Drouin et al., "Improving Border Localization of Multi-Baseline Stereo Using Border-Cut", International Journal of Computer Vision, Jul. 2009, vol. 83, Issue 3, 8 pgs.

Duparre et al., "Artificial apposition compound eye fabricated by micro-optics technology", Applied Optics, Aug. 1, 2004, vol. 43, No. 22, pp. 4303-4310.

Duparre et al., "Artificial compound eye zoom camera", Bioinspiration & Biomimetics, 2008, vol. 3, pp. 1-6.

Duparre et al., "Artificial compound eyes—different concepts and their application to ultra flat image acquisition sensors", MOEMS and Miniaturized Systems IV, Proc. SPIE 5346, Jan. 2004, pp. 89-100.

Duparre et al., "Chirped arrays of refractive ellipsoidal microlenses for aberration correction under oblique incidence", Optics Express, Dec. 26, 2005, vol. 13, No. 26, pp. 10539-10551.

Duparre et al., "Micro-optical artificial compound eyes", Bioinspiration & Biomimetics, 2006, vol. 1, pp. R1-R16.

Duparre et al., "Microoptical artificial compound eyes—from design to experimental verification of two different concepts", Proc. of SPIE, Optical Design and Engineering II, vol. 5962, pp. 59622A-1-59622A-12.

Duparre et al., "Microoptical Artificial Compound Eyes—Two Different Concepts for Compact Imaging Systems", 11th Microoptics Conference, Oct. 30-Nov. 2, 2005, 2 pgs.

Duparre et al., "Microoptical telescope compound eye", Optics Express, Feb. 7, 2005, vol. 13, No. 3, pp. 889-903.

Duparre et al., "Micro-optically fabricated artificial apposition compound eye", Electronic Imaging—Science and Technology, Prod. SPIE 5301, Jan. 2004, pp. 25-33.

Duparre et al., "Novel Optics/Micro-Optics for Miniature Imaging Systems", Proc. of SPIE, 2006, vol. 6196, pp. 619607-1-619607-15.

Duparre et al., "Theoretical analysis of an artificial superposition compound eye for application in ultra flat digital image acquisition devices", Optical Systems Design, Proc. SPIE 5249, Sep. 2003, pp. 408-418.

Duparre et al., "Thin compound-eye camera", Applied Optics, May 20, 3005, vol. 44, No. 15, pp. 2949-2956.

Duparre et al., "Ultra-Thin Camera Based on Artificial Apposistion Compound Eyes", 10th Microoptics Conference, Sep. 1-3, 2004, 2 pgs.

Fanaswala, "Regularized Super-Resolution of Multi-View Images", Retrieved on Nov. 10, 2012. Retrieved from the Internet at URL:<http://www.site.uottawa.ca/-edubois/theses/Fanaswala_thesis.pdf>, 163 pgs.

Farrell et al., "Resolution and Light Sensitivity Tradeoff with Pixel Size", Proceedings of the SPIE Electronic Imaging 2006 Conference, 2006, vol. 6069, 8 pgs.

Farsiu et al., "Advances and Challenges in Super-Resolution", International Journal of Imaging Systems and Technology, 2004, vol. 14, pp. 47-57.

Farsiu et al., "Fast and Robust Multiframe Super Resolution", IEEE Transactions on Image Processing, Oct. 2004, vol. 13, No. 10, pp. 1327-1344.

Farsiu et al., "Multiframe Demosaicing and Super-Resolution of Color Images", IEEE Transactions on Image Processing, Jan. 2006, vol. 15, No. 1, pp. 141-159.

Feris et al., "Multi-Flash Stereopsis: Depth Edge Preserving Stereo with Small Baseline Illumination", IEEE Trans on PAMI, 2006, 31 pgs.

Fife et al., "A 3D Multi-Aperture Image Sensor Architecture", Custom Integrated Circuits Conference, 2006, CICC '06, IEEE, pp. 281-284.

Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.

Fischer et al., Optical System Design, 2nd Edition, SPIE Press, pp. 191-198.

Fischer et al., Optical System Design, 2nd Edition, SPIE Press, pp. 49-58.

Hamilton, "JPEG File Interchange Format, Version 1.02", Sep. 1, 1992, 9 pgs.

Hardie, "A Fast Image Super-Algorithm Using an Adaptive Wiener Filter", IEEE Transactions on Image Processing, Dec. 2007, vol. 16, No. 12, pp. 2953-2964.

Horisaki et al., "Irregular Lens Arrangement Design to Improve Imaging Performance of Compound-Eye Imaging Systems", Applied Physics Express, 2010, vol. 3, pp. 022501-1-022501-3.

(56) References Cited

OTHER PUBLICATIONS

Horisaki et al., "Superposition Imaging for Three-Dimensionally Space-Invariant Point Spread Functions", Applied Physics Express, 2011, vol. 4, pp. 112501-1-112501-3.

Kang et al., "Handling Occlusions inn Dense Multi-View Stereo", Computer Vision and Pattern Recognition, 2001, vol. 1, pp. I-103-I-110.

Kitamura et al., "Reconstruction of a high-resolution image on a compound-eye image-capturing system", Applied Optics, Mar. 10, 2004, vol. 43, No. 8, pp. 1719-1727.

Krishnamurthy et al., "Compression and Transmission of Depth Maps for Image-Based Rendering", Image Processing, 2001, pp. 828-831.

\* cited by examiner

SYSTEMS AND METHODS FOR SYNTHESIZING HIGH RESOLUTION IMAGES USING IMAGE DECONVOLUTION BASED ON MOTION AND DEPTH INFORMATION

CROSS-REFERENCE TO RELATED APPLICATIONS

The current application claims priority to U.S. Provisional Patent Application Ser. No. 61/788,078, filed Mar. 15, 2013, the disclosure of which is hereby incorporated by reference in its entirety.

FIELD OF THE INVENTION

The present invention relates to systems and methods for image deconvolution and more specifically to synthesizing high resolution images using image deconvolution processes.

BACKGROUND

Imaging devices, such as cameras, can be used to capture images of portions of the electromagnetic spectrum, such as the visible light spectrum, incident upon an image sensor. For ease of discussion, the term light is generically used to cover radiation across the entire electromagnetic spectrum. In a typical imaging device, light enters through an opening (aperture) at one end of the imaging device and is directed to an image sensor by one or more optical elements such as lenses. The image sensor includes pixels or sensor elements that generate signals upon receiving light via the optical element. Commonly used image sensors include charge-coupled device (CCDs) sensors and complementary metal-oxide semiconductor (CMOS) sensors. Each pixel in an image sensor is capable of capturing light and converting the captured light into electrical signals. In order to separate the colors of light and capture a color image, a Bayer filter is often placed over the image sensor, filtering the incoming light into its red, blue, and green (RGB) components that are then captured by the image sensor. The RGB signal captured by the image sensor using a Bayer filter can then be processed and a color image can be created.

SUMMARY OF THE INVENTION

Systems and methods for synthesizing high resolution images using image deconvolution and depth information in accordance embodiments of the invention are disclosed. In one embodiment, an array camera includes a processor and a memory connected to the processor and configured to store an image deconvolution application, wherein the image deconvolution application configures the processor to obtain light field image data, where the light field image data includes a synthesized high resolution image having a plurality of pixels, a depth map, and metadata describing the motion associated with a capturing device that captured the light field image data, determine motion data based on the metadata contained in the light field image data, generate a depth-dependent point spread function based on the synthesized high resolution image, the depth map, and the motion data, where the depth-dependent point spread function describes the blurriness of points within the synthesized high resolution image based on the motion of the capturing device and the depth of the pixels described in the depth map, measure the quality of the synthesized high resolution image based on the generated depth-dependent point spread function, when the measured quality of the synthesized high resolution image is within a quality threshold, incorporate the synthesized high resolution image into the light field image data, and when the measured quality of the synthesized high resolution image is outside the quality threshold, determine updated motion data based on the measured quality and the depth-dependent point spread function, generate an updated depth-dependent point spread function based on the updated motion data, and synthesize a new high resolution image based on the updated depth-dependent point spread function.

In an additional embodiment of the invention, the array camera further includes an array camera module including an imager array having multiple focal planes and an optics array configured to form images through separate apertures on each of the focal planes, wherein the array camera module is configured to communicate with the processor, and wherein the obtained light field image data includes image data captured by the imager array.

DETAILED DESCRIPTION

Figure 1:
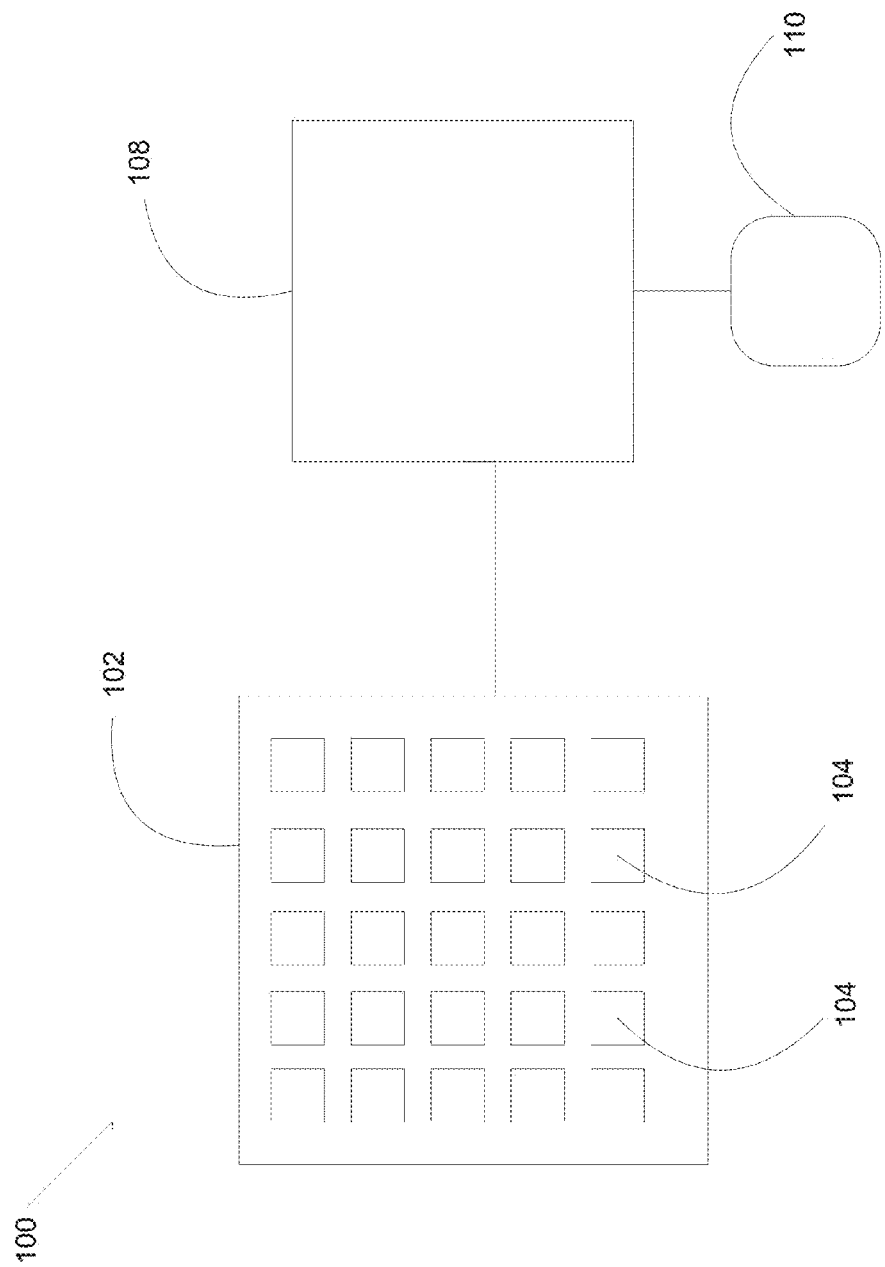
FIG. 1 is a system diagram of an array camera including a 5×5 imager array with storage hardware connected with a processor in accordance with an embodiment of the invention.

Turning now to the drawings, systems and methods for performing image deconvolution processes utilizing depth information in accordance with embodiments of the invention are illustrated. Array cameras, such as those described in U.S. patent application Ser. No. 12/935,504, entitled "Capturing and Processing of Images using Monolithic Camera Array with Heterogeneous Imagers" to Venkataraman et al., can be utilized to capture light fields and store the captured light fields. In a variety of embodiments, a light field is captured by obtaining image data forming a two dimensional array of image data of a scene captured from multiple viewpoints. In accordance with many embodiments of the invention, images, including high resolution images, may be synthesized from image data captured by an appropriately configured array camera using a super-resolution process. Systems and methods for performing super-resolution processing on image data captured by an array camera in accordance with embodiments of the invention are disclosed in U.S. patent application Ser. No. 12/967,807 entitled "System and Methods for Synthesizing High Resolution Images Using Super-Resolution Processes" to Lelescu et al. In many instances, the process of synthesizing a high resolution image may result in a single image, a stereoscopic pair of images that can be used to display three dimensional (3D) information via an appropriate 3D display, and/or a variety of images from different viewpoints. The process of synthesizing high resolution images from lower resolution image data captured by an imager array in an array camera typically involves performing parallax detection and correction to reduce disparity between the images captured by each of the cameras in the array camera module. Processes for parallax detection and correction in accordance with embodiments of the invention are disclosed in U.S. patent application Ser. No. 13/972,881 entitled "Systems and Methods for Parallax Detection and Correction in Images Captured Using Array Cameras that Contain Occlusions using Subsets of Images to Perform Depth Estimation" to Venkataraman et al. In many embodiments, processes for performing parallax detection and correction yield depth information. Therefore, processes for synthesizing high resolution images using lower resolution image data using super-resolution processes can also involve the generation of a depth map describing the depth information. The term depth map refers to metadata that describes the distance from the camera to the portion of the scene captured in the pixels (or a subset of the pixels) of an image.

Image data captured using a camera are often blurry due to the quality of the sensor, movement of the camera, hand jitter, and/or other factors affecting the quality of the captured image data. The flaws in blurry images can be further exacerbated when the blurry images are used to synthesize images using super-resolution processes, resulting in images containing flaws influencing the blurriness and quality of the synthesized image. In particular, the flaws in the captured image data affect the quality of the synthesized image depend based in part on the depth of the flaws within the synthesized image. Note that, in a variety of embodiments, the synthesized image need not be synthesized using super-resolution processes; rather any image synthesized from image data containing depth information can be affected by flaws in the captured light field due to the motion of the capturing device during the capture.

Image deconvolution devices (such as array cameras configured to via software to perform image deconvolution processes) in accordance with embodiments of the invention are configured to perform image deconvolution processes on synthesized images to improve the quality of the synthesized image by compensating for the motion of the device during the capturing of a light field from multiple viewpoints from which the image is synthesized. Image deconvolution devices are configured to perform image deconvolution processes by generating a depth-dependent (and/or motion dependent) point spread function (PSF) based on the motion of the array camera capturing the image data utilized in the synthesis of the image being deconvoluted and the depth information determined in the performance of parallax detection and correction in synthesizing the image. A depth-dependent PSF describes the sharpness and/or blurriness of points within a synthesized image based on the motion of the capturing device and the depth of the points. PSFs utilize blur kernels to describe the blur for the points within the synthesized image. A blur kernel is a function describing the sharpness (and/or blur) of the area surrounding a point within a synthesized image. The motion of the array camera can be determined using a blind motion estimation process, an ego-motion estimation of the array camera motion, and/or the motion of the array camera as measured by the array camera. Although the processes described herein are in reference to performing image deconvolution processes on entire images, it should be noted that the processes described herein can be performed on tiles or patches of images in accordance with embodiments of the invention.

The disclosures of each of U.S. patent application Ser. Nos. 12/935,504, 12/967,807, and 13/972,881 are hereby incorporated by reference in their entirety. Although the systems and methods described are with respect to array cameras configured to both capture and process captured light fields, devices (including image deconvolution devices that are not configured to capture light fields) that are configured to obtain captured light fields captured using a different device and process the received data can be utilized in accordance with the requirements of a variety of embodiments of the invention. Additionally, any of the various systems and processes described herein can be performed in sequence, in alternative sequences, and/or in parallel (e.g. on different computing devices) in order to achieve similar results in a manner that is more appropriate to the requirements of a specific application of the invention. Systems and methods for performing image deconvolution processes on synthesized images in accordance with embodiments of the invention are described below.

Array Camera Architectures

Array cameras in accordance with many embodiments of the invention include sensors such as, but not limited to, an inertial movement sensor system or inertial measurement unit, configured to measure the motion of the array camera at the time a light field is captured. An array camera including an imager array in accordance with an embodiment of the invention is illustrated in FIG. 1. The array camera 100 includes an array camera module including an imager array 102 having multiple focal planes 104 and an optics array configured to form images through separate apertures on each of the focal planes. The imager array 102 is configured to communicate with a processor 108. In accordance with many embodiments of the invention, the processor 108 is configured to read out image data captured by the imager array 102 and synthesize images using super-resolution processes. Imager arrays including multiple focal planes are discussed in U.S. patent application Ser. No. 13/106,797, entitled "Architectures for System on Chip Array Cameras" to McMahon et al., the entirety of which is hereby incorporated by reference.

In the illustrated embodiment, the focal planes are configured in a 5×5 array. In other embodiments, any of a variety of array configurations can be utilized including linear arrays and subsets of the array. Each focal plane 104 of the imager array is capable of capturing image data from an image of the scene formed through a distinct aperture. Typically, each focal plane includes a plurality of rows of pixels that also forms a plurality of columns of pixels, and each focal plane is contained within a region of the imager that does not contain pixels from another focal plane. The pixels or sensor elements utilized in the focal planes can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light (e.g. any electromagnetic signal) incident on the structure. In many embodiments, the sensor elements of each focal plane have similar physical properties and receive light via the same optical channel and color filter (where present). In other embodiments, the sensor elements have different characteristics and, in many instances, the characteristics of the sensor elements are related to the color filter applied to each sensor element. In a variety of embodiments, a Bayer filter pattern of light filters can be applied to one or more of the focal planes 104. Similarly, the sensor elements can be configured to capture information from non-visible light sources, such as infrared as appropriate to the specific requirements of embodiments of the invention.

In a variety of embodiments, the processor 108 is connected to an inertial movement sensor system 110 that is configured to capture motion information related to the rotation and/or translation of the array camera. A variety of inertial measurement sensors can be utilized in accordance with a number of embodiments of the invention including, but not limited to, gyroscopes and microelectromechanical system (MEMS) accelerometers. In several embodiments, the inertial movement sensor system 110 is configured to measure the rotation and/or translation of the imager array 102. In many embodiments, measuring the rotation and/or translation of the imager array 102 involves measuring the rotation and/or translation of the focal planes 104. In a number of embodiments, the inertial movement sensor 110 is integrated into or connected to the imager array 102 and the processor 108 is configured to receive the rotation and/or translation information from the imager array 102. In order to calibrate the inertial movement sensor system 110 to the imager array 102 (and/or focal planes 104), an a priori rigid motion transformation is determined that calibrates the motion data determined using the inertial movement sensor 110 to the movement of the imager array 102. Processes for determining an a priori rigid motion transformation in accordance with embodiments of the invention are discussed below.

In several embodiments, information captured by one or more focal planes 104 is read out of the imager array 102 as packets of image data. In several embodiments, a packet of image data contains one or more pixels from a row of pixels captured from each of one or more of the focal planes 104. Packets of image data may contain other groupings of captured pixels, such as one or more pixels captured from a column of pixels in each of one or more focal planes and/or a random sampling of pixels. Systems and methods for reading out image data from array cameras that can be utilized in array cameras configured in accordance with embodiments of the invention are described in U.S. Pat. No. 8,305,456 entitled "Systems and Methods for Transmitting and Receiving Array Camera Image Data" to McMahon, the disclosure of which is incorporated by reference herein in its entirety.

In a number of embodiments, the captured packets of image data are associated with an image packet timestamp. In many embodiments, inertial movement data captured using the inertial movement sensor system 110 is associated with an inertial movement measurement timestamp. In several embodiments, the processor 108 associates one or more packets of image data with inertial movement measurement data based upon the image packet timestamp(s) and the inertial movement measurement timestamp. In several embodiments, there is a delay in the capture between the first pixel captured by the focal plane 104 and the last pixel captured. As is discussed further below, image deconvolution processes in accordance with embodiments of the invention utilize the timestamps associated with the image data and the inertial measurement data to accommodate variations in motion during the period in time in which image data utilized in synthesizing a high resolution image is captured.

Array cameras are configured to create a light field image data file containing a synthesized high resolution image and metadata generated using the captured light field image data. One such file format is the JPEG-DX extension to ISO/IEC 10918-1 described in U.S. patent application Ser. No. 13/631,731, titled "Systems and Methods for Encoding Light Field Image Files" to Venkataraman et al, the entirety of which is hereby incorporated by reference. The metadata can include a variety of data captured and/or generated by the array camera, including, but not limited to, the generated depth information, the timestamp information, and/or motion data describing the motion of the array camera during the capture of the image data.

Although a specific array camera utilized in array camera configured to perform image deconvolution processes is illustrated in FIG. 1, alternative architectures can also be utilized as appropriate to the requirements of specific applications in accordance with embodiments of the invention. Systems and methods for synthesizing high resolution images using image deconvolution processes in accordance with embodiments of the invention are discussed below.

Image Deconvolution Devices

Figure 2:
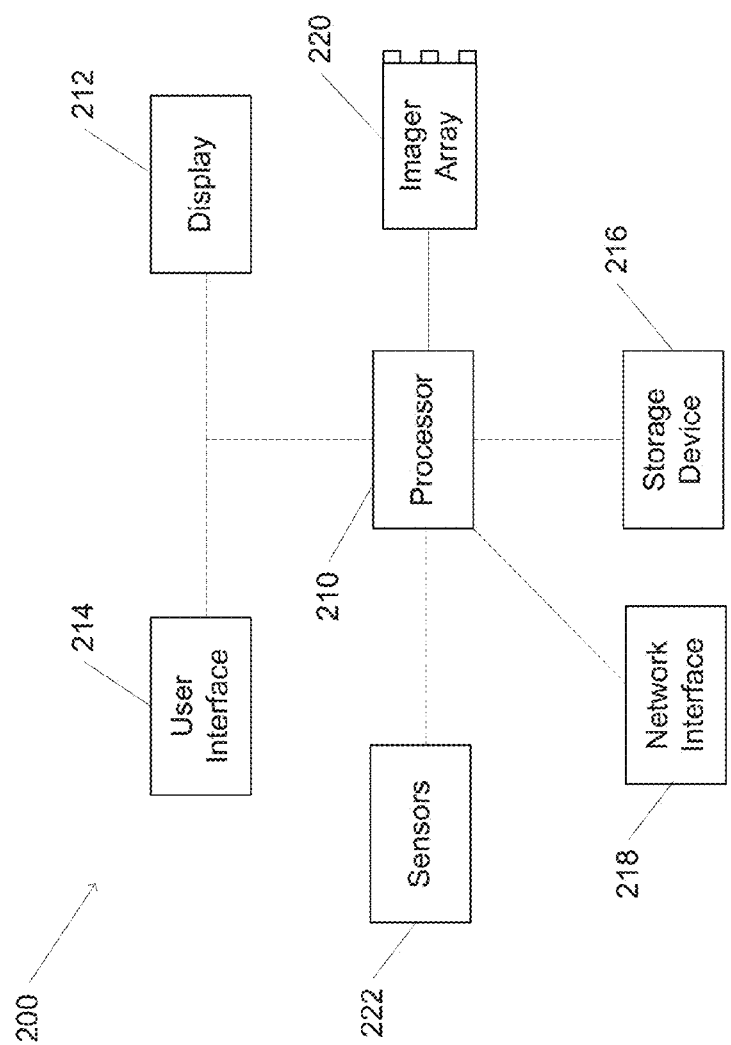
FIG. 2 is a functional block diagram of an image deconvolution device configured to perform image deconvolution processes on synthesized images in accordance with an embodiment of the invention.

A variety of devices can be configured to synthesize high resolution images using captured light fields and image deconvolution processes, including array cameras and other devices that are not capable of capturing image data using an imager array. A diagram of an image deconvolution device in accordance with an embodiment of the invention is illustrated in FIG. 2. The image deconvolution device 200 contains a processor 210 capable of being configured via software (e.g. an image deconvolution application) to load and manipulate light field image data files. In many embodiments of the invention, the processor 210 is connected to an imager array 220 capable of capturing light fields. In a variety of embodiments, the imager array 220 is configured to capture light field image data utilizing processes similar to those described above.

In many embodiments, the processor 210 is connected to a display 212 capable of displaying two dimensional images synthesized using a captured light field. In several embodiments, the display 212 is capable of displaying three dimensional images. In a number of embodiments, the processor 210 is connected to a user interface 214, such as a touch-screen interface, a pointing device, and/or a keyboard. In many embodiments, the user interface 214 can be a camera or array camera capable of tracking user movements. In several embodiments, the processor 210 is connected to a storage device 216. The storage device 216 is capable of storing light field image data files and synthesized images and delivering the stored data to the processor 210 for manipulation. In a number of embodiments, the processor 210 is connected to a network interface 218 capable of communication via a network. The network communication involves receiving and transmitting light field image data files and/or synthesized images, where the light field image data files and/or synthesized images can be stored in storage device 216 (if present) or can be loaded directly into the processor 210.

In several embodiments, the processor 210 is configured to synthesize images using image data captured using the imager array utilizing super-resolution processes as described above. The processor 210 can perform image deconvolution processes on the synthesized images (or any other images including depth information) using a depth-dependent point spread function (PSF) determined using motion and depth information. The processor 210 can determine the motion information using a variety of processes, including, but not limited to, blind motion estimation, ego-motion estimation, or using measured motion information contained in metadata in the light field image data files. Processes for determining depth-dependent point spread functions and measuring the motion of an array camera are described in detail below. In a number of embodiments, input received from the user interface 214 can be utilized in the image deconvolution process.

Although a specific example of an array camera configured to perform image deconvolution processes is described above with respect to FIG. 2, any device capable performing image deconvolution processes on images having depth information can be used in accordance with embodiments of the invention. Processes for image deconvolution of synthesized images in accordance with embodiments of the invention are discussed below.

Blind Image Deconvolution

Figure 3:
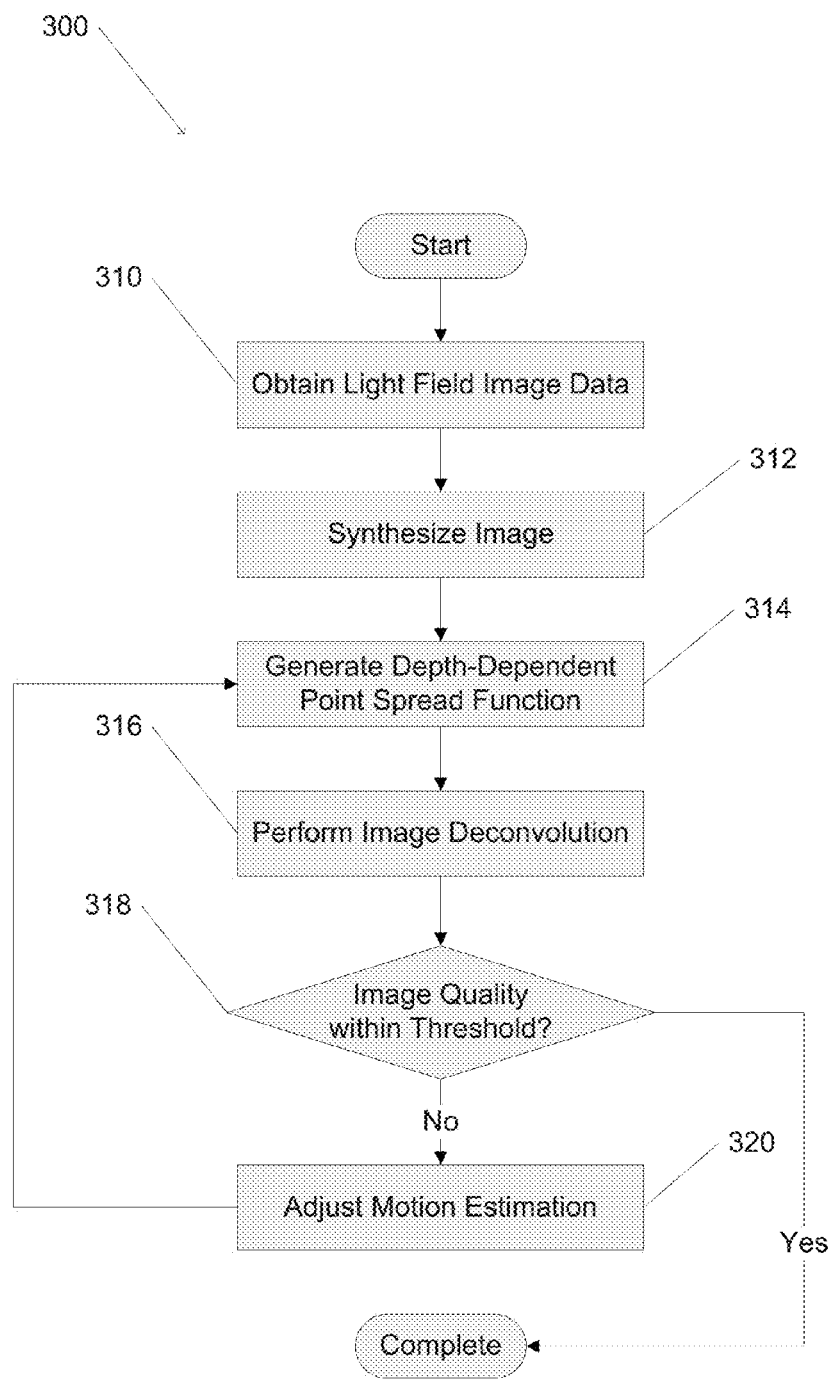
FIG. 3 is a flow chart illustrating a process for blind image deconvolution of a synthesized image using depth information in accordance with an embodiment of the invention.

In order to create a sharp image, image deconvolution devices are configured to perform image deconvolution processes on images having depth information. However, many images do not have information regarding the motion of the capturing device. Image deconvolution devices in accordance with embodiments of the invention are configured to perform a blind estimation of the motion of the capturing device utilized in the image deconvolution process. A process for performing blind image deconvolution in accordance with an embodiment of the invention is illustrated in FIG. 3. The process 300 includes obtaining (310) light field image data. An image is synthesized (312). A depth-dependent point spread function is generated (314) and image deconvolution is performed (316) on the synthesized image. If the quality of the synthesized image is within (318) a threshold value, the process completes. If the quality of the synthesized image is not within (318) the threshold, the motion estimation is adjusted (320) and a new depth-dependent point spread function is generated (314).

In a variety of embodiments, the light field image data is obtained (310) directly from an array camera utilizing processes similar to those described above. In a number of embodiments, the light field image data is obtained (310) from a light field image data file. In several embodiments, the synthesized (312) image is contained in the light field image data. In many embodiments, an image is synthesized (312) using the light field image data. The synthesized (312) image contains metadata, where the metadata includes a depth map describing depth information related to the points within the synthesized image. A depth-dependent PSF is generated (314) using the depth map and a motion estimation. Processes for generating depth-dependent PSF in accordance with embodiments of the invention are discussed below. The camera motion estimation can be any predefined value (including no motion at all) as appropriate to the requirements of a specific application in accordance with embodiments of the invention. Image deconvolution is performed (316) using the depth-dependent PSF and the quality of the resulting image is analyzed. If the quality of the image is within (318) a quality threshold, the image is considered of sufficient quality and the process 300 completes. The quality threshold can be dependent on any visual properties of the image as appropriate to the requirements of a specific application in accordance with embodiments of the invention, including the sharpness of the image. The quality threshold can be pre-determined and/or determined dynamically. If the image quality is not within the threshold (318), the motion estimation is adjusted (320). A number of processes can be utilized to adjust (320) the motion estimation, such as gradient ascent, gradient descent, or any other iterative optimization technique as appropriate to the requirements of a specific application in accordance with embodiments of the invention.

Although a specific process for performing blind image deconvolution of synthesized images having depth information in accordance with an embodiment of the invention is described above with respect to FIG. 3, processes appropriate to the requirements of specific applications can be utilized in accordance with embodiments of the invention. Processes for performing image deconvolution using estimated and/or measured camera motion in accordance with embodiments of the invention are discussed below.

Image Deconvolution with Estimated Motion Information

Figure 4:
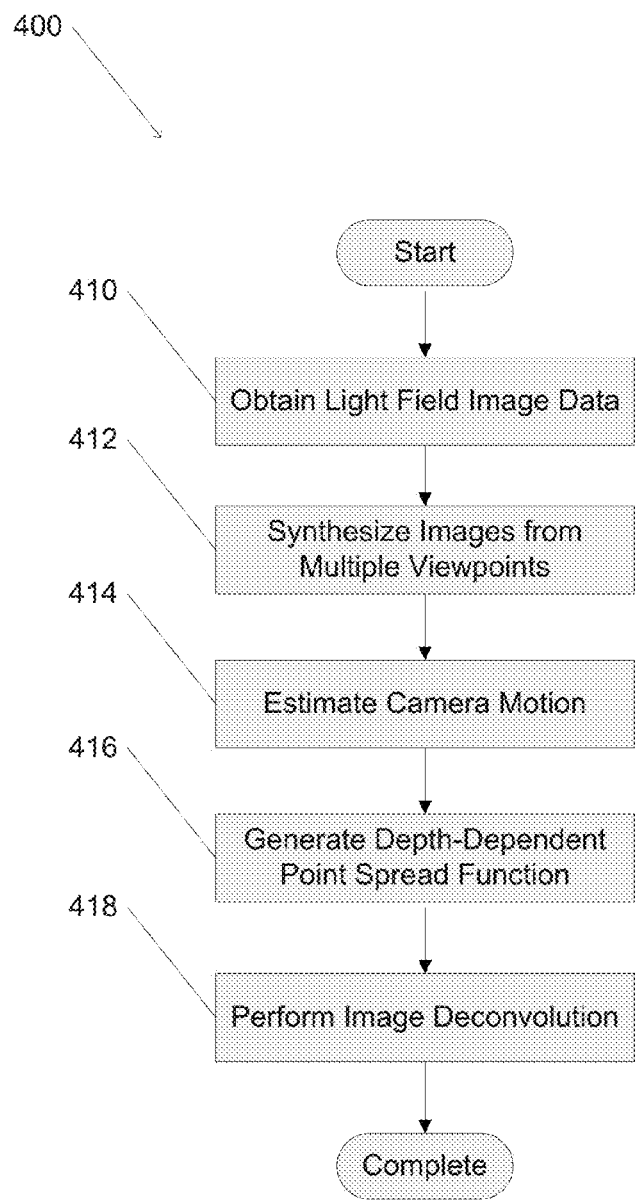
FIG. 4 is a flow chart illustrating a process for image deconvolution of a synthesized image using estimated camera motion in accordance with an embodiment of the invention.

A variety of image deconvolution devices are configured to estimate the motion of the camera capturing the image being deconvoluted. A process for performing image deconvolution using estimated motion information in accordance with an embodiment of the invention is illustrated in FIG. 4. The process 400 includes obtaining (410) light field image data. Images from multiple viewpoints are synthesized (412). Camera motion is estimated (414), a depth-dependent point spread function is generated (416), and image deconvolution is performed (418).

In several embodiments, obtaining (410) light field image data using processes similar to those described above. Synthesizing (412) images from multiple viewpoints includes performing a number of super-resolution processes using the light field image data and the associated depth map to create multiple views of the same scene. Estimating (414) camera motion is performed using ego-motion techniques in accordance with embodiments of the invention. Ego-motion techniques estimate camera motion by detecting features in a first image and matching those features to a second image. This matching process is performed using pairs of the synthesized (412) images. Based on the matching of the features, an optical flow field is generated; the optical flow field describes the estimate of the motion of the camera. Other techniques for estimating (414) camera motion can be utilized as appropriate to the requirements of a specific application in accordance with embodiments of the invention. The depth-dependent point spread function is generated (416) using the estimated camera motion and the depth map. Image deconvolution is performed (418) using processes similar to those described above.

A specific process for performing image deconvolution using estimated camera motion in accordance with an embodiment of the invention is described above with respect to FIG. 4; however, a variety of processes can be utilized in accordance with embodiments of the invention. Processes for performing image deblurring using depth information, determining the motion of array cameras, and generating point spread functions are described below.

Image Deconvolution with Measured Motion Information

Figure 5:
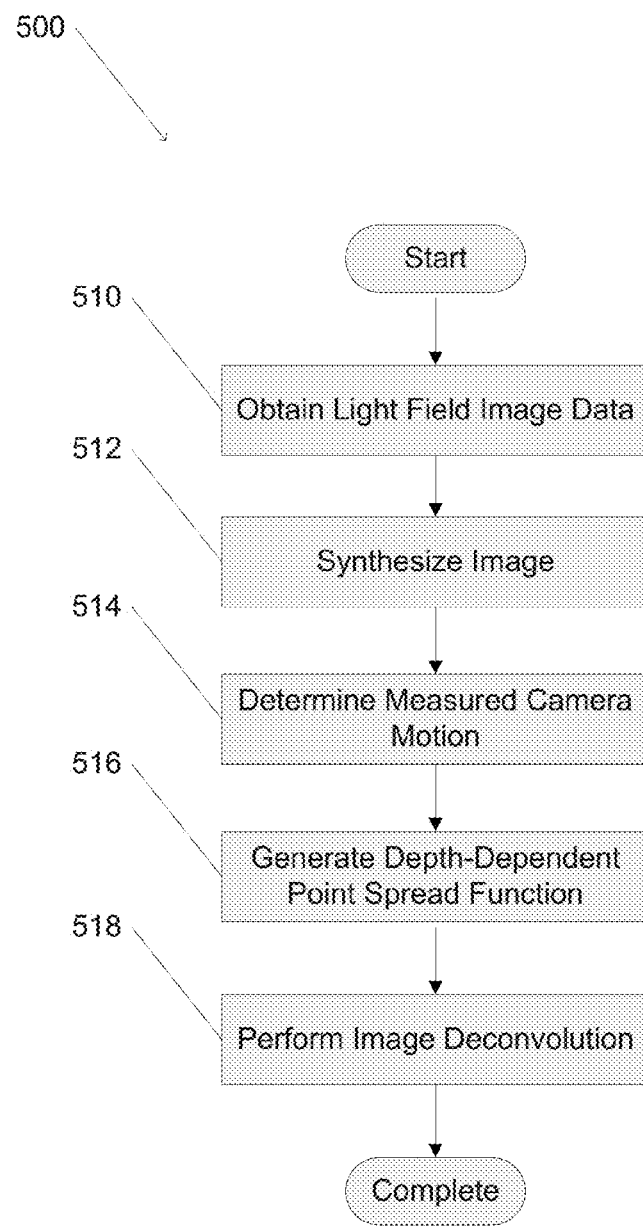
FIG. 5 is a flow chart illustrating a process for image deconvolution of a synthesized image using measured camera motion in accordance with an embodiment of the invention.

Array cameras in accordance with embodiments of the invention are configured to capture motion data describing the motion of the array camera at the time image data is captured. A process for performing image deconvolution using measured motion information in accordance with an embodiment of the invention is illustrated in FIG. 5. The process 500 includes obtaining (510) light field image data and synthesizing (512) an image. The measured camera motion is determined (514), a depth-dependent point spread function is determined (516), and image deconvolution is performed (518).

In a number of embodiments, obtaining (510) light field image data and synthesizing (512) an image are performed utilizing processes similar to those described above. The measured camera motion is determined (514) using motion information contained in the light field image data. In many embodiments, the motion information is directly stored as metadata in the light field image data. In a variety of embodiments, the motion information is determined (514) by correlating motion information along with time information contained in the light field image data. The correlation of the motion information with the time information describes how quickly the array camera moved as packets of image data included in the light field image data were read from the focal planes in the imager array of the array camera. The determined (514) measured motion information and the depth map are utilized to generate (516) the depth-dependent point spread function. In several embodiments, image deconvolution is performed (518) utilizing processes similar to those described above.

A specific process for performing image deconvolution of light field images using depth and camera motion information in accordance with an embodiment of the invention is described above with respect to FIG. 5; however, a variety of processes can be utilized in accordance with embodiments of the invention. Processes for determining the motion of array cameras and generating point spread functions are described below.

Calibrating the Motion of an Array Camera

Figure 6:
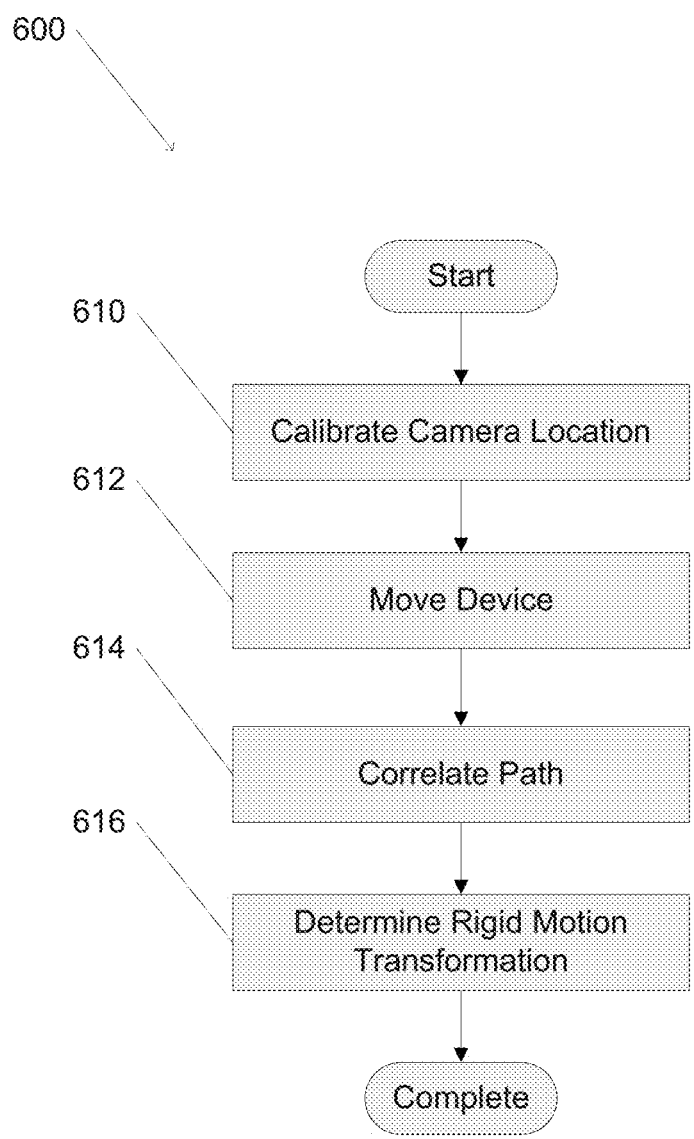
FIG. 6 is a flow chart illustrating a process for determining an a priori rigid motion transformation of an imager array in accordance with an embodiment of the invention.

As discussed above, the motion of an array camera capturing image data is utilized in the deconvolution of images captured using the array camera. Many array cameras include motion sensors configured to determine the motion of the array camera as image data is captured. In order to align the motion sensor to the captured image data, an a priori rigid motion transformation is determined to calibrate the motion data captured by the sensor with the actual movement of the array camera. This a priori rigid motion transformation can be stored in a variety of manners, including as metadata associated with a captured light field, for use in later image processing. A process for determining an a priori rigid motion transformation for use in an array camera configured to perform image deconvolution processes in accordance with an embodiment of the invention is illustrated in FIG. 6. The process 600 includes calibrating (610) the location of an imager array contained in an array camera. The array camera is moved (612). The path of the array camera is correlated (614) with motion information obtained from an inertial measurement sensor. The a priori rigid motion transformation is determined (616).

In a number of embodiments, calibrating (610) the array camera includes performing intrinsic and extrinsic camera calibration. Systems and methods for calibrating a camera module in an array camera are disclosed in U.S. Provisional Patent Application Ser. No. 61/780,748, titled "Systems and Methods for Calibration of an Array Camera" and filed Mar. 13, 2013, the entirety of which is hereby incorporated by reference. In a variety of embodiments, the movement (612) of the camera can be random and/or a pre-determined path. In accordance with many embodiments of the invention, captured light fields contain a two dimensional array of two dimensional images. These two dimensional images contain a plurality of pixels, where each pixel is associated with a coordinate representing where that pixel exists in the captured light field and/or a timestamp representing the time that the pixel was captured. In many embodiments, the array camera captures one or more light fields while the array camera is moved (612). In a variety of embodiments, the path of the array camera as it is moved (612) is determined by mapping the motion of one or more pixels between the captured light fields. In several embodiments, the path of the array camera as it is moved (612) is determined using one or more pixels in a captured light field.

In a variety of embodiments, correlating (614) the motion information to the pixel motion utilizes motion timestamps associated with the captured motion information and pixel timestamps associated with the captured pixels. In a number of embodiments, determining (616) the a priori rigid motion transformation is a function that correlates (614) the motion information to the mapped pixel motion within a predefined error threshold. In many embodiments, the error threshold is dynamically determined. The a priori rigid motion transformation includes, but is not limited to, rotation information and translation information.

In several embodiments, inertial measurement sensors include, but are not limited to, gyroscopes, accelerometers, and magnetometers. In a number of embodiments, an array camera contains a plurality of inertial measurement sensors. In many embodiments, inertial measurement sensors have measurement errors and/or accumulate errors over time due to sensor noise. In accordance with embodiments of the invention, the path of the array camera can be correlated (614) using one or more pixels in each captured light field. By correlating (614) the motion data with the pixels in successive captured light fields, errors due to inertial measurement sensor error can be held within a predefined margin of error. In many embodiments, correlating (614) the motion data is performed using pixels in a single captured light field. In several embodiments, the margin of error is dynamically determined. In several embodiments, the process 600 can be performed once, for example, at the time the array camera is manufactured. In a variety of embodiments, process 600 can be performed during the use of the array camera to refine the calibration of the motion sensor by updating the a priori rigid motion transformation based on changes in the array camera.

A specific process for determining an a priori rigid motion transformation for use in an array camera configured to perform image deconvolution processes in accordance with an embodiment of the invention is described above with respect to FIG. 6; however, a variety of processes can be utilized to determine a priori rigid motion transformations as appropriate to the requirements of a specific application in accordance with embodiments of the invention. Processes for generating point spread functions in accordance with embodiments of the invention are discussed below.

Generating a Point Spread Function

Figure 7:
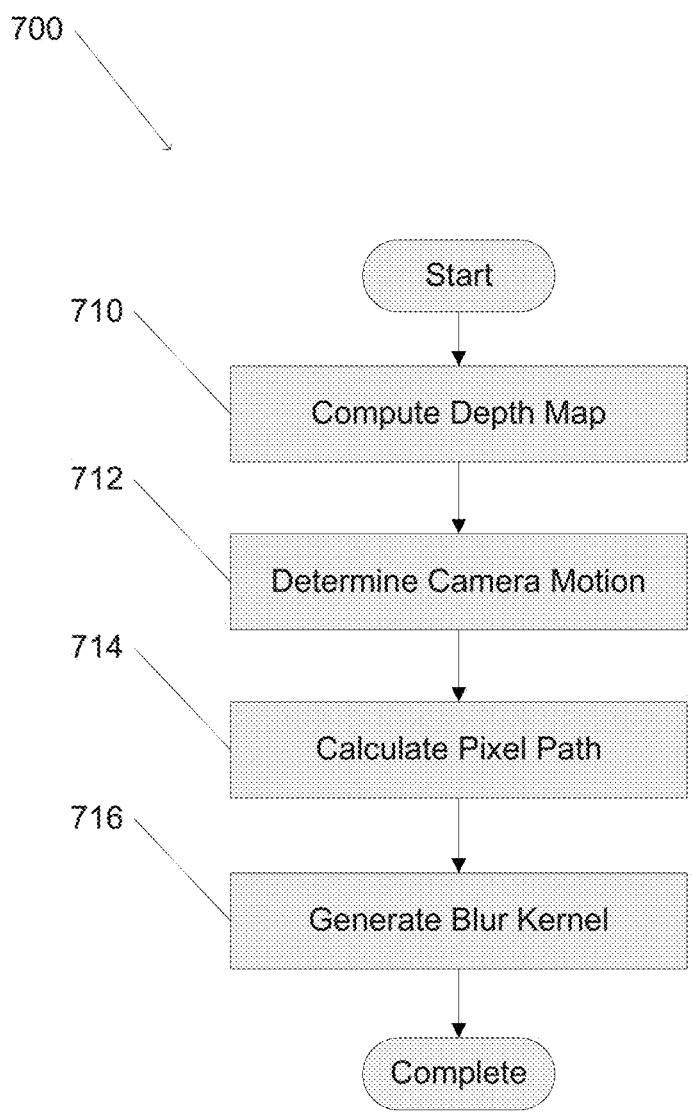
FIG. 7 is a flow chart illustrating a process for generating a depth-dependent point spread function in accordance with an embodiment of the invention.

A PSF describes the response of an imaging system to a point object. For example, an imaging system may not be able to precisely capture a point object, resulting in the blurring of the point object across more than one pixel on a focal plane of an imager array. In images with depth information, the blurring of point objects depends on the depth of the point object from the focal plane of the image. Image deconvolution devices configured to perform image deconvolution processes in accordance with embodiments of the invention utilize depth-dependent PSFs to correct for the blurring of point objects in synthesized images based on the depth of the point objects within the synthesized image. A process for generating a point spread function using depth information in accordance with an embodiment of the invention is illustrated in FIG. 7. The process 700 includes computing (710) a depth map for a captured light field. Camera motion is determined (712). The pixel path is calculated (714) for one or more pixels in the captured light field. A blur kernel is generated (716) for the one or more pixels.

Systems and methods for computing (710) depth maps that can be utilized in accordance with a variety of embodiments of the invention are described in U.S. patent application Ser. No. 13/972,881, incorporated by reference above. Other systems and methods for computing (710) depth maps can be utilized in accordance with the requirements of a number of embodiments of the invention. In many embodiments, camera motion is determined (712) using an inertial measurement sensor. In several embodiments, processes similar to those described above can be utilized to determine (712) camera motion. In a number of embodiments, camera motion is determined using ego-motion estimation algorithms. In many embodiments, generating (714) the pixel path involves determining the movement of one or more pixels in a scene using the camera motion. In a number of embodiments, the camera motion is an a priori rigid motion transformation generated using a process such as that described above. In several embodiments, the blur kernel is generated (716) using the pixel path calculated (714) for the one or more pixels. In many embodiments, the calculated (714) pixel path and the blur kernel generated (716) are for pixels at varying depth levels in the captured light field. In a variety of embodiments, the blur kernel is generated (716) utilizing pixel timestamps associated with one or more pixels and/or motion timestamps associated with motion data captured using the inertial measurement sensor.

A point p in a scene is located at a location p(x,y,z), where (x,y,z) represents the three-dimensional location of the point in the scene. Applying an a priori rigid motion transformation having rotation R and translation T to a point p in a light field will result in the point p moving to $$M_{R,T}(p) = (RT)p$$

and the imaged position q=P(x,y,z) will move to $$PM_{R,T}(p)$$

where P is the projective transformation of the array camera capturing the light field. In several embodiments, the projective transformation of the array camera includes scene independent geometric corrections and scene dependent geometric transformations of the array camera as described in U.S. Provisional Patent Application Ser. No. 61/780,748, the entirety of which is incorporated by reference above.

An a priori rigid motion transformation $M_{R,T}$ is represented by a rotation $R_n$ and a translation $T_n$ for a time sampling period N=1, . . . , n. Applying the a priori rigid motion transformation to pixel p over the time sampling period calculates (714) pixel path $$q_n = PM_n(p)$$

where $$M_n(p) = P(R_n T_n \ldots R_1 T_1)$$

Point spread functions contain a blur kernel that describes the response of the array camera to a point object. In accordance with embodiments of the invention, the blur kernel K for a pixel path $q_n$ for a time sampling period N=1, . . . , n is generated (716) using the formula $$K = c \sum_{n=1}^{N} G(q_n - q_1, \sigma)$$

where c is a nominalization constant and $G(q_n-q_1,\sigma)$ is a two dimensional radial symmetric Gaussian distribution with mean $q_n-q_1$ and standard deviation $\sigma$. In a number of embodiments, $G(q_n-q_1,\sigma)$ is a variety of probability distributions known to those of ordinary skill in the art. In several embodiments, applying the Gaussian distribution to the pixel path generates (716) a depth-dependent spatially varying blur kernel utilized in a PSF for each pixel depending on the depth of the pixel in the light field. In many embodiments, the depth of each pixel is determined using parallax information determined using processes as described in U.S. patent application Ser. No. 13/972,881, the entirety of which is incorporated by reference above.

A specific process for generating a point spread function using depth information in accordance with an embodiment of the invention is described above with respect to FIG. 7; however, a variety of processes can be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An array camera, comprising:
   a processor; and
   a memory connected to the processor and configured to store an image deconvolution application;
   wherein the image deconvolution application configures the processor to:
   obtain light field image data, where the light field image data comprises a synthesized high resolution image having a plurality of pixels, a depth map, and metadata describing the motion associated with a capturing device that captured the light field image data;
   determine motion data based on the metadata contained in the light field image data;
   generate a depth-dependent point spread function based on the synthesized high resolution image, the depth map, and the motion data, where the depth-dependent point spread function describes the blurriness of points within the synthesized high resolution image based on the motion of the capturing device and the depth of the pixels described in the depth map;
   measure the quality of the synthesized high resolution image based on the generated depth-dependent point spread function;
   when the measured quality of the synthesized high resolution image is within a quality threshold, incorporate the synthesized high resolution image into the light field image data; and
   when the measured quality of the synthesized high resolution image is outside the quality threshold;
   determine updated motion data based on the measured quality and the depth-dependent point spread function;
   generate an updated depth-dependent point spread function based on the updated motion data; and
   synthesize a new high resolution image based on the updated depth-dependent point spread function.

2. The array camera of claim 1, further comprising an array camera module comprising an imager array having multiple focal planes and an optics array configured to form images through separate apertures on each of the focal planes;
  wherein the array camera module is configured to communicate with the processor; and
  wherein the obtained light field image data comprises image data captured by the imager array.

* * * * *